United States Patent
Luo et al.

(10) Patent No.: US 9,043,890 B1
(45) Date of Patent: May 26, 2015

(54) DISTRIBUTED AUTHENTICATION AGAINST STORED USER IDENTIFIERS AND USER TEMPLATES VIA PSEUDONYM ASSOCIATION

(71) Applicant: EMC Corporation, Hopkinton, MA (US)

(72) Inventors: Guoying Luo, Lexington, MA (US); Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 99 days.

(21) Appl. No.: 13/905,600

(22) Filed: May 30, 2013

(51) Int. Cl.
 G06F 21/00 (2013.01)
 G06F 21/31 (2013.01)
 G06F 21/32 (2013.01)
 H04L 29/06 (2006.01)

(52) U.S. Cl.
 CPC ............... *G06F 21/31* (2013.01); *G06F 21/32* (2013.01); *H04L 63/083* (2013.01); *H04L 63/08* (2013.01)

(58) Field of Classification Search
 CPC .......... H04L 63/83; G06F 21/31; G06F 21/32
 USPC .......................................................... 726/7
 See application file for complete search history.

(56) References Cited

U.S. PATENT DOCUMENTS

| 6,446,052 | B1 * | 9/2002 | Juels .............................. 705/69 |
| 7,330,974 | B1 * | 2/2008 | Silverbrook et al. ......... 713/176 |
| 2004/0187029 | A1 * | 9/2004 | Ting .............................. 713/201 |
| 2008/0148043 | A1 * | 6/2008 | Lucidarme et al. ........... 713/155 |
| 2008/0222425 | A1 * | 9/2008 | Buss .............................. 713/185 |
| 2009/0327706 | A1 * | 12/2009 | Ikeda et al. .................... 713/156 |
| 2011/0060908 | A1 * | 3/2011 | Pizano et al. .................. 713/168 |
| 2011/0145908 | A1 * | 6/2011 | Ting .................................. 726/7 |
| 2011/0162052 | A1 * | 6/2011 | Hayward .......................... 726/5 |
| 2012/0144468 | A1 * | 6/2012 | Pratt et al. ........................ 726/7 |
| 2012/0167189 | A1 * | 6/2012 | Aichroth et al. .................. 726/7 |
| 2013/0219480 | A1 * | 8/2013 | Bud .................................. 726/7 |
| 2013/0232557 | A1 * | 9/2013 | Shimono .......................... 726/4 |

(Continued)

OTHER PUBLICATIONS

M. Barbosa et al., "Secure Biometric Authentication With Improved Accuracy," 13th Australasian Conference on Information Security and Privacy (ACISP), Jul. 2008, pp. 21-36, Wollongong, Australia.

(Continued)

*Primary Examiner* — Harunur Rashid
*Assistant Examiner* — Shahriar Zarrineh
(74) *Attorney, Agent, or Firm* — Ryan, Mason & Lewis, LLP

(57) ABSTRACT

An authentication system including a first server configured to store identifiers of respective users in association with respective pseudonyms, and a second server configured to store templates of the respective users in association with the respective pseudonyms. Input is received from a given user in conjunction with an authentication attempt. The first server is configured to determine if a first portion of the received input is associated with one of the user identifiers stored in the first server. If the first portion of the received input is associated with one of the user identifiers stored in the first server, the corresponding pseudonym is provided from the first server to the second server. The given user is authenticated based on a determination as to whether or not a second portion of the received input matches one of the stored user templates corresponding to the pseudonym provided to the second server.

21 Claims, 3 Drawing Sheets

(56) References Cited

U.S. PATENT DOCUMENTS

2014/0282958 A1* 9/2014 Salonen ............................ 726/7
2014/0289842 A1* 9/2014 Cornick et al. .................. 726/19

OTHER PUBLICATIONS

J. Richiardi et al., "A Distributed Multimodal Biometric Authentication Framework," Proc. 3d Cost 275 Workshop on Biometrics on the Internet, Oct. 2005, 4 pages, Hatfield, United Kingdom.

E. Maiorana et al., "Secure Biometric Authentication System Architecture Using Error Correcting Codes and Distributed Cryptography," Proceedings of Gruppo Nazionale Telecommunicazioni Meeting, Jun. 2007, 12 pages, Rome, Italy.

Neyire Deniz Sarier, "A Survey of Distributed Biometric Authentication Systems," Special Interest Group on Biometrics and Electronic Signatures (BIOSIG), Sep. 2009, 12 pages, Darmstadt, Germany.

R. Impagliazzo et al., "Anonymous Credentials with Biometrically-Enforced Non-Transferability," Proceedings of the 2003 ACM Workshop on Privacy in the Electronic Society (WPES '03), Oct. 2003, 12 pages, New York, New York.

M. Osadchy et al., "SCiFI—A System for Secure Face Identification," IEEE Symposium on Security and Privacy (S&P), 2010, 16 pages.

J. Bringer et al., "An Application on the Boneh and Shacham Group Signature Scheme to Biometric Authentication," Proceedings of the 3rd International Workshop on Security (IWSEC), Nov. 2008, 11 pages, Kagawa, Japan.

\* cited by examiner

DISTRIBUTED AUTHENTICATION AGAINST STORED USER IDENTIFIERS AND USER TEMPLATES VIA PSEUDONYM ASSOCIATION

FIELD

The field relates generally to authentication systems, and more particularly to authentication techniques that involve matching user input against stored templates.

BACKGROUND

In many authentication systems, input received from a user is matched against a template previously stored for that user. The user templates are often stored in direct association with respective user identifiers. For example, in one type of biometric authentication system with server-side template matching, a biometric reader associated with an endpoint computing device or other type of client device samples a biometric value from a user, such as a fingerprint, an iris image, keystroke dynamics, etc. This sample is transmitted to a server for comparison with a stored user template. The authentication attempt succeeds if a biometric authentication algorithm determines that the sample matches the template.

Maintaining the confidentiality of biometric data in such a system is important to prevention of impersonation attacks. In the absence of strong hardware protections on the biometric reader and an authenticated channel to the server that stores the templates, there is no assurance that biometric samples are honestly presented by a user, rather than injected or simulated by an attacker. That is, the integrity of the system hinges on the confidentiality of stored templates.

Biometrics are particularly sensitive authentication secrets because they are often a scarce resource. In some cases, they are non-revocable. For example, a user can change the fingerprint he or she uses to authenticate at most nine times. They are also subject to sharing across systems. Additionally, biometrics tend to comprise innately personal information. Consequently their disclosure may be viewed as a breach of user privacy.

A server-side biometric authentication system of the type described above typically involves the aggregation of templates from many users in a single database. Given this aggregation and the special sensitivity of biometric templates, system compromise can have extensive repercussions. Similar problems arise with other types of user templates and other authentication systems.

SUMMARY

Illustrative embodiments of the present invention provide distributed authentication techniques in which user templates are separated from respective user identifiers for storage on different servers but nonetheless remain linked to those user identifiers via respective pseudonyms. Such arrangements exhibit significantly enhanced security relative to conventional arrangements in which user templates are stored in direct association with their corresponding user identifiers.

In one embodiment, an authentication system comprises a first server configured to store identifiers of respective users in association with respective pseudonyms, and a second server configured to store templates of the respective users in association with the respective pseudonyms.

Input is received from a given user in conjunction with an authentication attempt. The first server is configured to determine if a first portion of the received input is associated with one of the user identifiers stored in the first server. If the first portion of the received input is associated with one of the user identifiers stored in the first server, the corresponding pseudonym is provided from the first server to the second server.

The given user can then be authenticated based on a determination as to whether or not a second portion of the received input matches one of the stored user templates corresponding to the pseudonym provided to the second server.

By way of example, the first portion of the received input may comprise a user identifier of the given user and the second portion of the received input may comprise a sample provided by the given user. More particularly, the first and second portions of the received input may comprise respective first and second ciphertexts, with the first ciphertext comprising the user identifier encrypted under a public key of the first server, and the second ciphertext comprising the sample encrypted under a public key of the second server.

The received input may further comprise a session identifier, with the first and second ciphertexts further comprising the session identifier encrypted under the respective public keys of the respective first and second servers.

In one possible arrangement of the type described above, the first ciphertext is decrypted in the first server, and if the user identifier from the decrypted first ciphertext matches one of the user identifiers stored in the first server, the corresponding pseudonym is sent from the first server to the second server. The corresponding pseudonym may be sent as a single pseudonym, or obscured in a set of pseudonyms that includes the corresponding pseudonym and a plurality of chaff pseudonyms. The second ciphertext is decrypted in the second server, and if the corresponding pseudonym sent from the first server matches one of the user templates stored in the second server, an attempt is made to match the sample from the decrypted second ciphertext against the corresponding stored template. If a set of pseudonyms is sent from the first server instead of a single pseudonym, for each of the pseudonyms in the set of pseudonyms sent from the first server that matches one of the user templates stored in the second server, an attempt is made to match the sample from the decrypted second ciphertext against the corresponding stored template.

Embodiments of the invention can be implemented in a wide variety of different authentication applications, including applications involving biometrics, behavioral profiling, and passwords or other static authenticators, as well as with numerous cryptographic forms of authentication.

DETAILED DESCRIPTION

Illustrative embodiments of the present invention will be described herein with reference to exemplary systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model. Also, the term "authentication system" is intended to be broadly construed, and may encompass at least a portion of a communication system.

Figure 1:
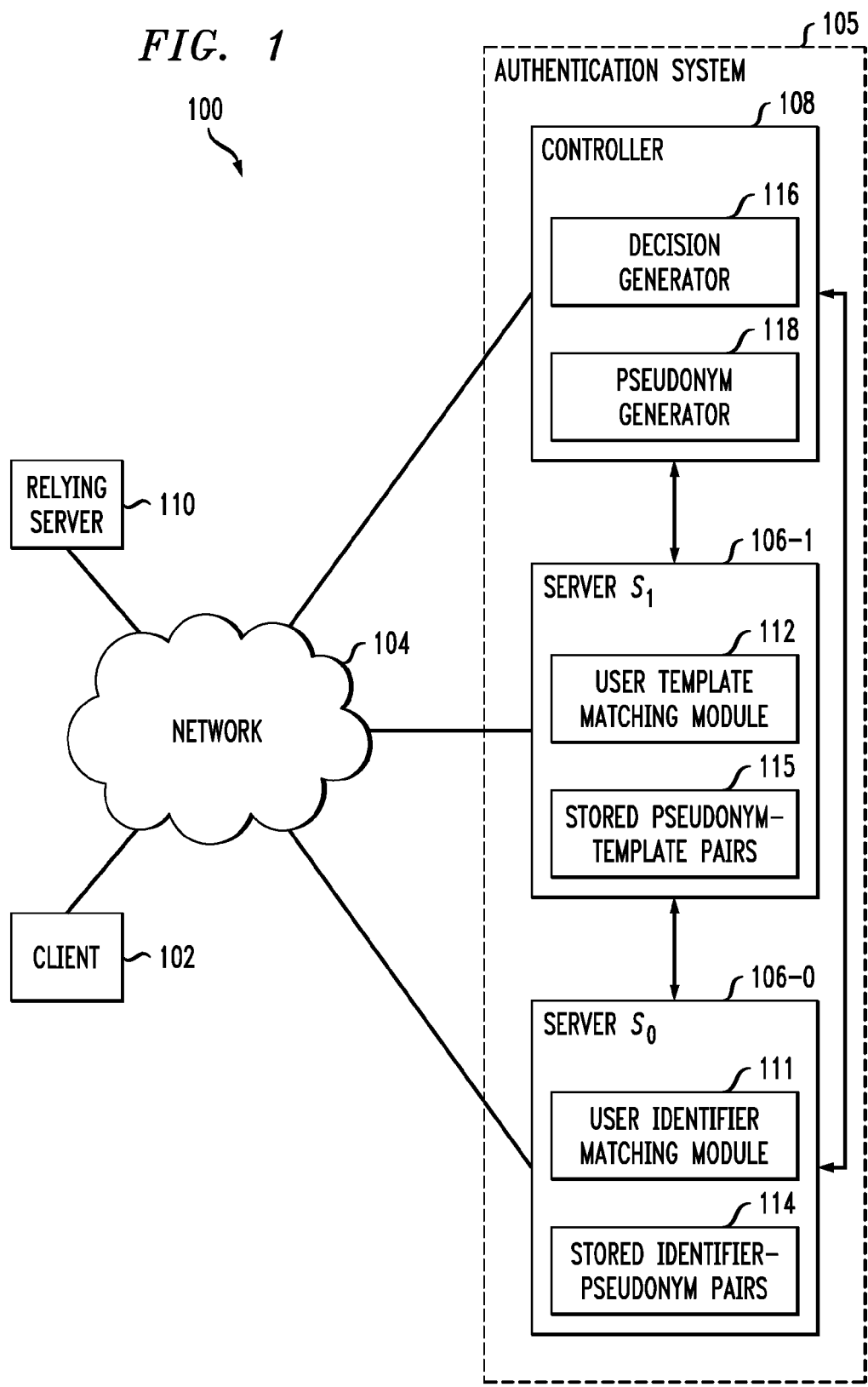
FIG. 1 is a block diagram of a communication system incorporating distributed authentication functionality in an illustrative embodiment of the invention.

FIG. 1 shows a communication system 100 that incorporates functionality for distributed authentication using pseudonym association between user identifiers stored on one server and user templates stored on another server. The system 100 comprises a client 102 that communicates over a network 104 with an authentication system 105. The authentication system 105 comprises first and second servers 106-0 and 106-1 coupled to a controller 108, although it should be understood that the particular number of servers shown in this embodiment is exemplary only. Accordingly, other embodiments may utilize more than two servers in implementing the authentication system 105. It is assumed in the present embodiment that the client 102 is able to communicate over the network 104 with each of the servers 106 and the controller 108, although other arrangements can be used in other embodiments. For example, in some embodiments, communication between the client 102 and one or more of the servers 106 may flow through the controller 108.

The client 102 may comprise, for example, a mobile telephone, laptop computer, tablet computer or other user device. The client 102 may be associated with a particular user, where "user" as the term is applied herein should be generally construed so as to encompass, for example, a human user or an associated hardware or software entity. Numerous alternative arrangements are possible.

A given user device may incorporate or otherwise have associated therewith a hardware or software authentication token, although such tokens are not required in embodiments of the invention. One example of an authentication token that may be used in conjunction with an authentication process in some embodiments is a time-synchronous authentication token such as an RSA SecurID® user authentication token.

The network 104 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

Also coupled to the network 104 in the present embodiment is a relying server 110 that relies on an authentication result produced by the controller 108 of the authentication system 105. In other embodiments, the relying server may instead be one or more of the servers 106, or another element of the authentication system 105.

The first and second servers 106-0 and 106-1 are also denoted in the figure as servers $S_0$ and $S_1$, respectively. The first server 106-0 comprises a user identifier matching module 111 and the second server 106-1 comprises a user template matching module 112.

The first server 106-0 is configured to store identifiers of respective users in association with respective pseudonyms. In the present embodiment, this storage is illustratively implemented as a set of stored identifier-pseudonym pairs 114, with each pair including a user identifier and its corresponding pseudonym.

The second server 106-1 is configured to store templates of the respective users in association with the respective pseudonyms. In the present embodiment, this storage is illustratively implemented as a set of pseudonym-template pairs 115, with each pair including a pseudonym and its corresponding template.

Thus, in the set of stored pairs 114, each of the user identifiers is associated with a corresponding pseudonym, and in the set of stored pairs 115, each of the pseudonyms is associated with a corresponding user template. The pseudonyms therefore serve to associate respective ones of the user identifiers stored on server 106-0 with respective ones of the user templates stored on server 106-1.

It is assumed that authentication of users in the authentication system 105 relies at least in part on attempting to match samples provided by those users with their respective stored user templates corresponding to their respective stored user identifiers. However, as indicated previously, the user templates are not stored, in direct association with their respective user identifiers. Instead, the pseudonyms are used to associate the user identifiers stored on server 106-0 with the user templates stored on server 106-1.

Such distribution minimizes the impact of compromise of a single server, in that passive compromise of either server fails to reveal the association between a particular user identifier and its corresponding user template. Further enhancements to be described prevent association disclosure in the presence of attacks by stronger adversaries.

The servers 106-0 and 106-1 may be implemented, for example, as respective physically separated processing devices, possibly located in different computing systems or organizations. Alternatively, such servers may represent distinct virtual servers that may reside on the same physical infrastructure. Other types of multiple server arrangements may be used in implementing the authentication system 105.

The sets of stored pairs 114 and 115 are assumed to be stored in respective memories of the servers 106-0 and 106-1. It should be noted that the particular ordering of terms such as identifier, pseudonym and template as used in the names or other labels of the sets of stored pairs 114 and 115 herein should not be construed as requiring any particular ordering of the corresponding stored information items in an actual memory of a processing device that implements a given one of the servers.

The controller 108 comprises a decision generator 116 and a pseudonym generator 118. The decision generator 116 is configured to generate authentication decisions responsive to received user input based at least in part on results of matching operations performed by the modules 111 and 112 of the respective first and second servers 106-0 and 106-1. The pseudonym generator 118 determines appropriate pseudonyms and provides those to the servers 106-0 and 106-1 for use in the sets of stored pairs 114 and 115. The pseudonym generator 118 in some embodiments may be operative to periodically refresh at least a subset of the stored pseudonyms.

Although shown as being separate from the servers 106 in the present embodiment, the controller 108 in other embodiments may be implemented at least in part in one or more of the servers 106. It is also possible that at least a portion of the controller 108 may be implemented in another system element, such as the relying server 110. Thus, for example, the relying server 110 in other embodiments may implement at least the decision generator 116 of the controller 108, and may be considered part of the authentication system 105.

The client 102, servers 106, controller 108 and server 110 may be implemented as respective processing devices. A given such processing device may comprise, for example, a computer or other type of processing device configured to communicate with other such devices over the network 104. Each such processing device generally comprises at least one processor and an associated memory, and implements one or more functional modules for controlling certain features of the system 100.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. Such a memory and other memories disclosed herein may be viewed as examples of what are more generally referred to as "computer program products" storing executable computer program code.

Various elements of the system 100, such as the matching modules 111 and 112 of the respective servers 106 and the decision generator 116 and pseudonym generator 118 of the controller 108, may be implemented at least in part in the form of software that is stored in a memory of a processing device and executed by a processor of that processing device.

The system 100 in the present embodiment implements one or more processes for distributed authentication using pseudonym association between stored user identifiers on one server and the corresponding stored user templates on another server. Examples of such a process performed at least in part in conjunction with the client 102 authenticating to the authentication system 105 will be described below, but it should be understood that numerous other types of processes may be used in other embodiments.

It is to be appreciated that the particular set of elements shown in FIG. 1 for providing distributed authentication via pseudonym association is presented by way of example, and in other embodiments additional or alternative elements may be used. Thus, another embodiment may include additional networks and additional sets of clients or servers.

As mentioned previously, various elements of system 100 such as clients, servers, controllers or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices. Examples of such processing platforms that may form at least a portion of the system 100 will be described below in conjunction with FIGS. 3 and 4.

The operation of the system 100 will now be described in greater detail with reference to the flow diagram of FIG. 2, which illustrates a set of operations performed by authentication system 105 in authenticating input received from a user in an illustrative embodiment.

The process as shown includes steps 200 through 216, all of which are assumed to be performed by elements of the authentication system 105. It is to be appreciated that in other embodiments one or more such steps may be implemented at least in part by other system elements.

Figure 2:
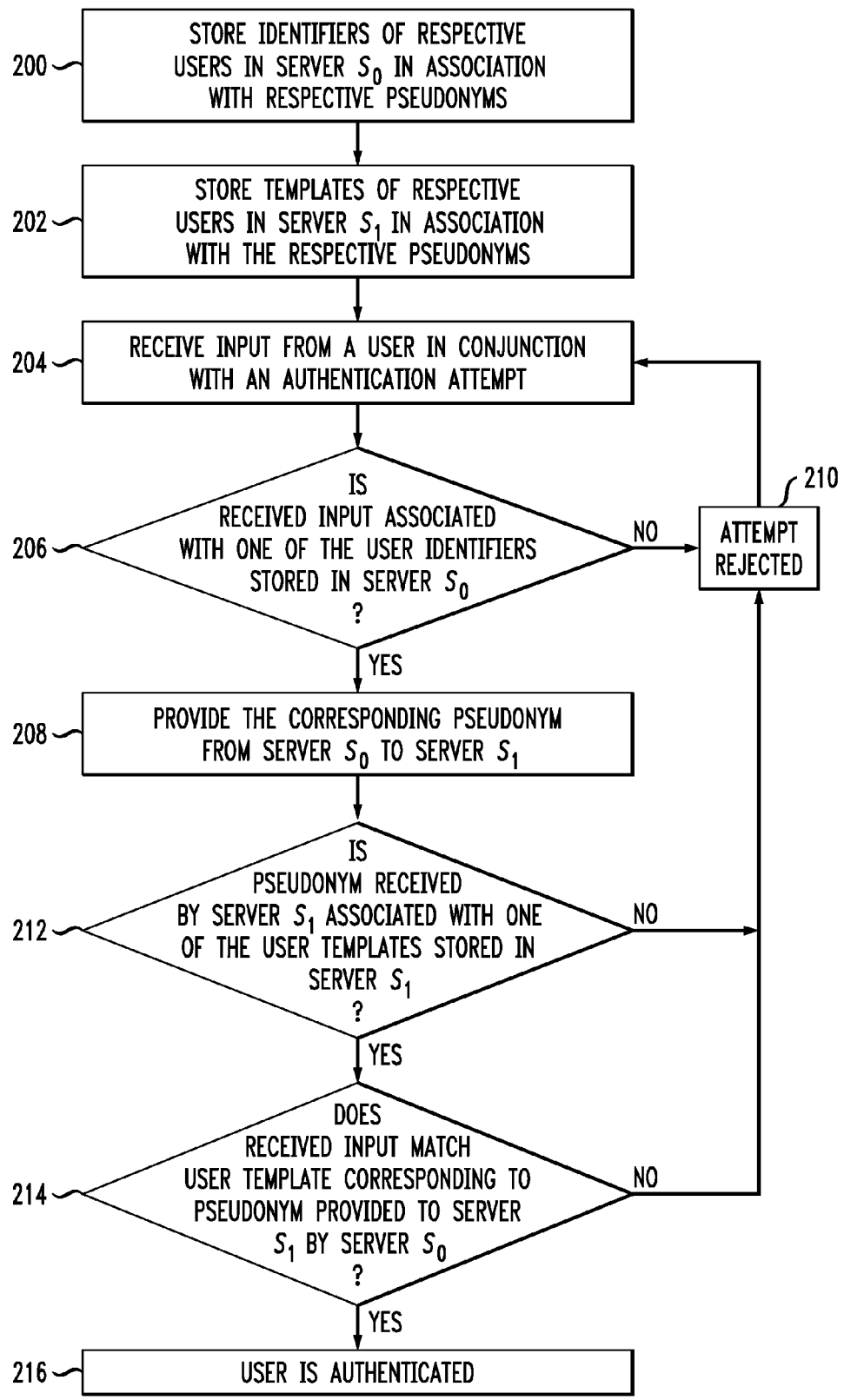
FIG. 2 is a flow diagram illustrating an exemplary distributed authentication process performed in the FIG. 1 system.

As in the previous description of authentication system 105 above, it is assumed for purposes of the illustrative process of FIG. 2 that authentication of a given user relies at least in part on attempting to match a sample provided by that user with a stored user template corresponding to a stored user identifier for the given user. Again, pseudonyms are used to associate the user identifiers stored on server 106-0 with the corresponding user templates stored on server 106-1. These servers are referred to as servers $S_0$ and $S_1$ in the following description of the steps of the FIG. 2 process.

In step 200, identifiers of respective users are stored in server $S_0$ in association with respective pseudonyms. The pseudonyms may comprise, for example, respective random values, where the term "random value" as used herein is intended to be broadly construed so as to also encompass pseudorandom values. Such random values or other types of pseudonyms may be generated by the pseudonym generator 118 and distributed by the controller 108 to the servers $S_0$ and $S_1$.

Accordingly, storing user identifiers in server $S_0$ in association with the respective pseudonyms may comprise storing in server $S_0$ a set of pairs $D_0=\{(U_i, r_i)\}$ where $U_i$ denotes the user identifier for user i and $r_i$ denotes the random value of the corresponding pseudonym. This is one example of a possible set of stored identifier-pseudonym pairs 114, although numerous other techniques may be used to store user identifiers in association with respective pseudonyms.

As another example, storing user identifiers in server $S_0$ in association with the respective pseudonyms may comprise storing in server $S_0$ a set of tuples $D_0=\{(U_i, R_i, r_i)\}$ where $U_i$ denotes the user identifier for user i, $r_i$ denotes the random value of the corresponding pseudonym, and $R_i$ is a set of m pseudonyms such that $r_i \in R_i$ and $R_i$ includes m−1 chaff pseudonyms in addition to the corresponding pseudonym. Such tuples are also considered to provide an example of stored identifier-pseudonym pairs 114, albeit in this case with the particular pseudonym for a given user identifier being obscured in a set of additional chaff pseudonyms. This use of chaff pseudonyms can provide enhanced security against certain types of attacks, as will be described in greater detail below.

The chaff pseudonyms should be selected so as to be very difficult to distinguish from the actual pseudonyms. For example, the chaff pseudonyms may be drawn randomly from a probability distribution substantially the same as that from which the actual pseudonyms are selected.

In step 202, templates of respective users are stored in server $S_1$ in association with the respective pseudonyms. The user templates in some embodiments may comprise respective biometric templates, although a wide variety of other types of templates may be used. The term "template" as used herein is intended to be broadly construed so as to encompass any type of stored information to which submitted user input is compared in conjunction with an authentication attempt.

The term "biometric template" is also intended to be broadly construed, so as to encompass, for example, a template characterized by a fingerprint, an iris image or other physiological information associated with a particular user, as well as a template characterized by behavioral information associated with a particular user, such as keystroke dynamics of that user, the times of day that the user typically accesses a given resource, etc.

Storing user templates in server $S_1$ in association with the respective pseudonyms may comprise storing in server $S_1$ a set of pairs $D_1=\{(r_i, T_i)\}$ where $T_i$ denotes the user template for user i and $r_i$ denotes the random value of the corresponding pseudonym. This is one example of a possible set of stored pseudonym-template pairs 115, although numerous other techniques may be used to store user templates in association with respective pseudonyms. Again, the ordering of names or identifiers such as $T_i$ and $r_i$ in the pair notation above and elsewhere herein should not be construed as requiring any particular storage layout in memory.

In step 204, input is received from a user in conjunction with an authentication attempt. This input in the present embodiment is assumed to comprise at least two distinct portions, including a first portion comprising a user identifier of the given user and a second portion comprising a sample provided by the given user. The sample may comprise, for example, a biometric sample from a biometric reader associated with the client 102, although a wide variety of other types of samples may be used. The term "sample" is therefore intended to be broadly construed, so as to encompass authentication information that is in addition to the user identifier and is submitted by a user to authentication system 105 in conjunction with an authentication attempt. It should again be noted that the term "user" in this context and elsewhere herein should not be construed as limited to a human user, but may additionally or alternatively refer, for example, to a particular hardware or software entity.

The first and second portions of the received input may be sent from the client 102 to the authentication system 105 in encrypted form. For example, the above-noted first and second portions of the received input of step 204 may comprise respective first and second ciphertexts, with the first ciphertext comprising the user identifier encrypted under a public key of the first server $S_0$, and the second ciphertext comprising the sample encrypted under a public key of the second server $S_1$. Such ciphertexts are decrypted by the respective servers $S_0$ and $S_1$ using their respective secret keys, and then further processed in a manner to be described in more detail below.

It is also possible for the received input of step 204 to comprise additional portions or other information beyond the user identifier and the sample. For example, the received input may further comprise a session identifier, with the first and second ciphertexts referred to above comprising the session identifier encrypted under the respective public keys of the respective servers $S_0$ and $S_1$. Alternatively, the session identifier may be separately encrypted as third and fourth ciphertexts to be supplied to the respective first and second servers, with each such ciphertext representing an additional portion of the received input.

In step 206, a determination is made as to whether or not the received input is associated with one of the user identifiers stored as part of the set of identifier-pseudonym pairs 114 in server $S_0$. If the received input is determined to incorporate or otherwise be associated with one of the stored user identifiers, the corresponding pseudonym from that particular pair is provided from server $S_0$ to server $S_1$ as indicated in step 208. Otherwise, the authentication attempt is rejected as indicated in step 210.

In step 212, a determination is made as to whether or not the pseudonym received by server $S_1$ is associated with one of the user templates stored as part of the set of pseudonym-template pairs 115 in server $S_1$. If the pseudonym received by server $S_1$ is associated with one of the stored user templates, the process moves to step 214 to attempt to match the sample portion of the received input against that particular user template. Otherwise, the authentication attempt is rejected as indicated in step 210.

In step 214, a determination is made as to whether or not the sample portion of the received input matches the particular user template corresponding to the pseudonym provided to server $S_1$ by server $S_0$. If there is a match between the sample portion of the received input and the user template, the user is considered authenticated as indicated in step 216. Otherwise, the authentication attempt is rejected as indicated in step 210.

The authentication of a given user in step 214 and possibly other portions of the FIG. 2 process may be performed at least in part by decision generator 116 of controller 108 based on information supplied thereto by the servers $S_0$ and $S_1$. Alternatively, this authentication may involve the relying server 110. It is also possible that the controller 108 can be implemented as a separate server, or incorporated in whole or in part into one or both of the servers $S_0$ and $S_1$. Numerous alternative arrangements are possible.

The particular processing operations and other system functionality described in conjunction with the flow diagram of FIG. 2 are presented by way of illustrative example only, and should not be construed as limiting the scope of the invention in any way. Alternative embodiments can use other types of processing operations for distributed authentication via pseudonym association between stored user identifiers and stored user templates. For example, the ordering of the process steps may be varied in other embodiments, or certain steps may be performed concurrently with one another rather than serially.

Also, authentication processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be further described herein, although alternative embodiments of the present invention may incorporate aspects of such processes.

Additional details regarding the operation of embodiments of the invention will now be provided with reference to exemplary arrangements in which it is again assumed for simplicity and clarity of illustration that there are only two servers $S_0$ and $S_1$. Those skilled in the art will recognize that the described two-server embodiments can be extended in a straightforward manner to other embodiments that include more than two servers.

It should also be appreciated that the particular features of the described two-server embodiments are presented by way of example only, and other embodiments need not incorporate these features.

An exemplary embodiment of the type described in conjunction with FIGS. 1 and 2 may be more particularly implemented as follows. Let $U_i$ denote a unique identifier for user i for $i \in Z_n$. Let $T_i$ be a corresponding biometric template. The authentication system 105 may implement a biometric matching algorithm $f(T', T) \rightarrow (accept, reject)$ that determines whether a submitted biometric sample S from a given user matches a stored biometric template T of that user. The two participating servers $S_0$ and $S_1$ are assumed to have respective public keys $PK_0$ and $PK_1$. An entity P makes an authentication decision using information provided by the servers $S_0$ and $S_1$. The entity P may represent, for example, the controller 108 or a particular portion thereof, such as the decision generator 116, or another system entity, such as relying server 110. As another example, the entity P may be implemented at least in part within one or both of the servers $S_0$ and $S_1$.

It is assumed that there are authenticated, confidential and integrity-protected channels between servers $S_0$, $S_1$ and entity P, and at least an integrity-protected channel between client 102 and entity P. In practice, secure channels may be established using techniques such as secure sockets layer (SSL) or transport layer security (TLS). Such techniques are well known in the art and therefore not described in detail herein.

In an initialization phase of operation, it is assumed that a set of random values $\{r_i\}_{i \in Z_n}$ is generated, where $r_i \in_R \{0,1\}^l$ for security parameter l. Server $S_0$ stores the set of pairs $D_0 = \{(U_i, r_i)\}_{i \in Z_n}$ in a random order, and server $S_1$ stores the set of pairs $D_1 = \{(r_i, T_i)\}_{i \in Z_n}$ also in a random order.

In an authentication phase of operation, it is assumed that P is authenticating a user that submits sample T' in a session having a unique session identifier σ. If a given one of the servers "accepts," then it sends the message (σ; accept) to P and to its counterpart server(s). Otherwise, it "rejects," sends (σ; reject) to P and to its counterpart server(s), and terminates the session.

The steps of the authentication process in this embodiment are as follows:

1. The client sends ciphertexts $C_0=E_{PK_0}[\sigma; U]$ and $C_1=E_{PK_1}[\sigma; T']$ to P.
2. P sends $C_0$ to $S_0$ and $C_1$ to $S_1$. The servers decrypt their respective ciphertexts.
3. If there exists a pair $(U, r) \in D_0$, then $S_0$ sends $(\sigma; r)$ to $S_1$ and accepts; otherwise, it sends $(\sigma; \phi)$ and rejects.
4. If there exists a pair $(r, T) \in D_1$, then $S_1$ sends $(\sigma; f(T', T))$ to P. Otherwise, it sends $(\sigma; \text{reject})$.

It should be noted that communications between P and one server may be tunneled through the other server. Alternatively, the client can communicate directly with one or both of $S_0$ and $S_1$. Other communication arrangements are possible.

An adversary that passively and ephemerally compromises $S_0$ and learns $D_0$ learns only pseudonyms, not templates. By compromising $S_1$ and learning $D_1$, an adversary learns templates and their associated pseudonyms, but not the identities of corresponding users.

An adversary that compromises both servers at any time, however, and obtains both $D_0$ and $D_1$ learns templates and corresponding user identifiers.

Additionally, an adversary that passively and persistently compromises server $S_1$ can learn the association between a user i and his or her template by means of an active probing attack, as follows. The adversary submits an arbitrary sample template T' on behalf of user i. The adversary observes which pair (r, T) server $S_1$ references to evaluate T'. The template T is that stored for the user.

Probing attacks of this type can be thwarted through modification of the above embodiment to support the use of the above-noted chaff pseudonyms, as will now be described in more detail.

In an initialization phase of operation, a set of random values $R=\{r_i\}_{i \in Z_n}$ is generated. Server $S_0$ stores the set of tuples $D_0=\{(U_i, R_i, r_i)\}_{i \in Z_n}$ in random order, and server $S_1$ stores the set of pairs $D_1=\{(r_i, T_i)\}_{i \in Z_n}$ also in random order. Here, $R_i \subseteq R$ is a set of m pseudonyms such that $r_i \in R_i$. In other words, $R_i$ includes m−1 chaff pseudonyms.

In an authentication phase of operation, it is again assumed that P is authenticating a user that submits sample T' in a session having a unique session identifier σ. As in the previous embodiment, if a given one of the servers "accepts," then it sends the message (σ; accept) to P and to its counterpart server(s). Otherwise, it "rejects," sends (σ; reject) to P and to its counterpart server(s), and terminates the session.

The steps of the authentication process in this embodiment are as follows:

1. The client sends ciphertexts $C_0=E_{PK_0}[\sigma; U]$ and $C_1=E_{PK_1}[\sigma; T']$ to P.
2. P sends $C_0$ to $S_0$ and $C_1$ to $S_1$. The servers decrypt their respective ciphertexts.
3. If there exists a tuple $(U, R, r) \in D_0$, then $S_0$ sends $(\sigma; R)$ to $S_1$. Otherwise, it rejects.
4. For all $r^{(j)} \in R$, with corresponding pair $(r^{(j)}, T^{(j)})$, $S_1$ computes $f(T', T^{(j)})$.
5. If there is no template $T^{(j)}$ such that $f(T', T^{(j)})=$accept, then $S_1$ rejects. Otherwise, $S_1$ accepts and sends $(\sigma; r^{(j)})$ to $S_0$. If there are multiple templates such that $f(T', T^{(j)})=$accept at $S_1$, the particular template achieving the best possible match may be selected by $S_1$ and used, to determine the pseudonym sent to $S_0$.
6. If $S_0$ receives (σ; r) from $S_1$, it accepts. Otherwise it rejects.

The particular authentication processes described above are exemplary only, and other embodiments may utilize different types of functions and process steps, as well as different numbers of servers, different types of messaging, different ciphertext formats and so on.

An adversary that compromises $S_1$ and initiates an authentication attempt for user $U_i$ observes transmission of $R_i$ from $S_0$. It thus learns only a set of m candidate templates corresponding to the user.

On observing $R_i$, however, if $R_i$ is user-specific, the adversary can subsequently identify $T_i$ on observing a valid authentication attempt by user $U_i$.

One countermeasure is to associate identical chaff sets with multiple users. For example, users may be partitioned into groups of size m, such that for each user $U_i$ in a given group, $R_i$ contains the pseudonyms of all m such users.

It is possible to accelerate the process of identifying a match between T' and candidates specified by R. Rather than doing so by means of one-to-one application of f as described above, one can first make use of an identification protocol, e.g., a one-to-many template-matching algorithm. Depending on its authentication strength, such an algorithm may be used as an alternative for f or may be used to identify the best match candidate as a preliminary to full evaluation by f.

Systemic intrusion can be detected in some embodiments as follows. In the normal course of use, it should rarely happen that one server accepts while the other rejects. If $S_0$ accepts while $S_1$ rejects, this signals a fault in $S_0$ and potentially a compromise of $S_0$, as $S_1$ only sends a user's pseudonym on accepting.

If $S_1$ accepts while $S_0$ rejects during an authentication attempt for user $U_i$, then a valid sample has been submitted for some user with a pseudonym in $R_i$, but not for user $U_i$. Such a failure can occur if two biometrics are difficult to differentiate between, indicating a poor false acceptance rate in the underlying matching algorithm. In this case, a realignment of user groups may be warranted. An adversary that has compromised $S_1$ and seeks to guess the template associated with a given user would produce the same event.

Proactive security can be provided in some embodiments. For example, it is possible to enforce security against an adversary that compromises both $S_0$ and $S_1$ at different times. In particular, pseudonyms may be periodically refreshed on a system-wide basis, as previously noted herein, possibly by pseudonym generator 118. Thus, on compromising $S_0$ and learning associated pseudonyms, an adversary is unable to link user identities to templates if it compromises $S_1$ after a refresh has taken place.

As mentioned previously, certain embodiments can be readily extended to more than two servers, possibly by employing a multi-server mix network for anonymization.

Also, the disclosed techniques can be extended for use with a wide variety of alternative authentication data. One example is a contextual profile, e.g., a record containing information about devices typically employed by the user, common transaction times of day, etc. Such behavioral information associated with a particular user is intended to be encompassed by the broad definition of "biometric template" used herein.

In these and other cases, an "accept" message from a given server may be accompanied by a score indicating the strength of the match.

The authentication systems described above can also be employed with static authenticators, such as passwords, and with cryptographic forms of authentication. Authentication data of this type is intended to be encompassed within the broad terms "template" and "sample" as used herein.

An adversary that has compromised $S_1$ can learn a targeted user's template by actively triggering an authentication by the user and observing the resulting biometric sample propagation into $S_1$. A potential countermeasure is to generate spurious authentication events, e.g., to cache and replay previous authentication attempts.

It is also possible to add bogus biometric templates to $D_1$, either with bogus accompanying pseudonyms or in association with valid pseudonyms. While this approach enlarges the storage requirements, it results in an attacker being unable to determine from $D_1$ alone whether a given template corresponds to any valid user. The bogus templates should of course be indistinguishable from valid ones. They may be generated synthetically or may be drawn from outside the system's user population. For example, they may be based on fingerprints from obsolete' police records.

The foregoing embodiments should be considered as illustrative only, and numerous other embodiments can be configured using the techniques disclosed herein, in a wide variety of different authentication applications. For example, as indicated previously, techniques described in the context of two servers can be extended in a straightforward manner to more than two servers.

It should also be understood that distributed authentication functionality such as that described in conjunction with FIGS. 1 and 2 can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The embodiments described in conjunction with FIGS. 1 and 2 can provide a number of significant advantages relative to conventional practice. For example, these embodiments exhibit significantly enhanced security relative to conventional arrangements in which user templates are stored in direct association with their corresponding user identifiers. The separation of user identities and user templates across two distinct servers ensures that compromise of one server does not reveal an association between a user identifier and a user template. Accordingly, embodiments of the invention can be used to mitigate the impact of server compromise in biometric authentication systems, as well as in numerous other applications. Additional enhancements using chaff pseudonyms can prevent association disclosure in the case of breach of both servers at different times and when an adversary actively initiates authentication attempts to probe the system.

As indicated previously, the communication system 100 may be implemented using one or more processing platforms. One or more of the processing modules or other components of system 100 may therefore each run on a computer, storage device or other processing platform element. A given such element may be viewed as an example of what is more generally referred to herein as a "processing device."

Figure 3:
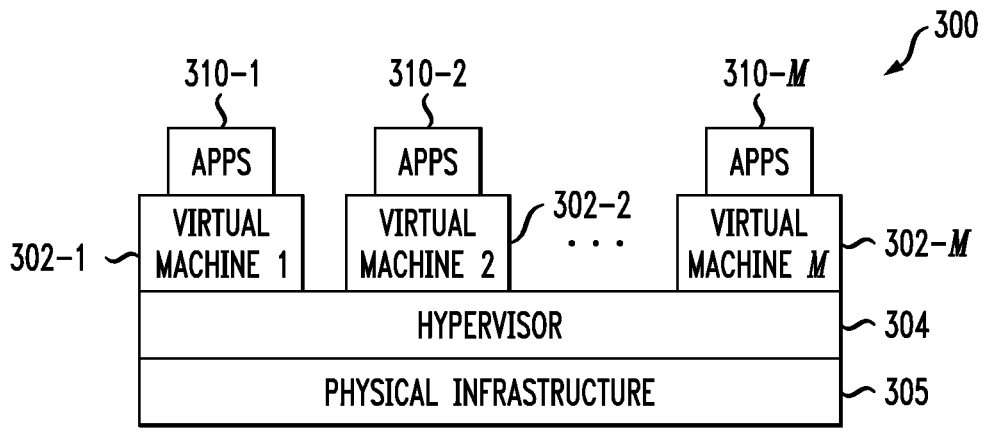
FIGS. 3 and 4 show examples of processing platforms that may be utilized to implement at least a portion of the communication system of FIG. 1.

Referring now to FIG. 3, one possible processing platform that may be used to implement at least a portion of one or more embodiments of the invention comprises cloud infrastructure 300. The cloud infrastructure 300 in this exemplary processing platform comprises virtual machines (VMs) 302-1, 302-2, ... 302-M implemented using a hypervisor 304. The hypervisor 304 runs on physical infrastructure 305. The cloud infrastructure 300 further comprises sets of applications 310-1, 310-2, ... 310-M running on respective ones of the virtual machines 302-1, 302-2, ... 302-M under the control of the hypervisor 304.

The cloud infrastructure 300 may encompass the entire system 100 or only portions of that system, such as one or more of client 102, servers 106, controller 108 or relying server 110 in the system 100.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of system 100.

Figure 4:
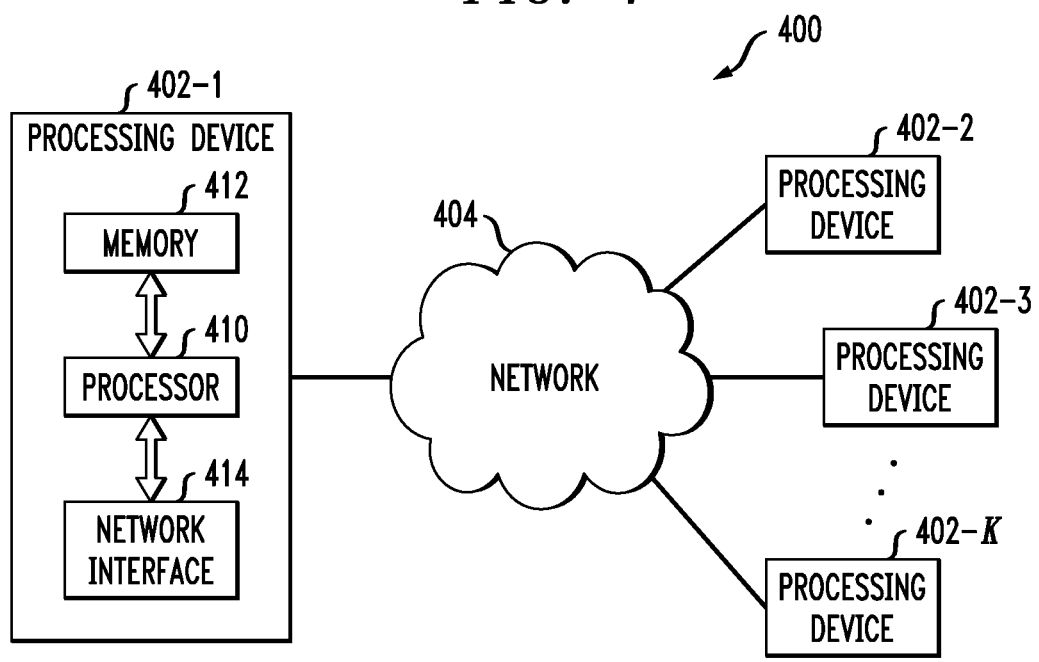

Another example of a processing platform is processing platform 400 shown in FIG. 4. The processing platform 400 in this embodiment comprises at least a portion of the system 100 and includes a plurality of processing devices, denoted 402-1, 402-2, 402-3, ... 402-K, which communicate with one another over a network 404. The network 404 may comprise any type of network, such as a WAN, a LAN, a satellite network, a telephone or cable network, a cellular network, a wireless network such as WiFi or WiMAX, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, storage devices or other processing devices.

Multiple elements of system 100 may be collectively implemented on a common processing platform of the type shown in FIG. 3 or 4, or each such element may be implemented on a separate processing platform.

It should again be emphasized that the above-described embodiments of the invention are presented for purposes of illustration only. Many variations and other alternative embodiments may be used. For example, the techniques are applicable to a wide variety of other types of devices and systems that can benefit from distributed authentication using pseudonyms to associate stored user identifiers with their respective stored user templates as disclosed herein. Also, the particular configuration of communication system and processing device elements shown in FIGS. 1-4, and the associated authentication techniques, can be varied in other embodiments. Moreover, the various simplifying assumptions made above in the course of describing the illustrative embodiments should also be viewed as exemplary rather than as requirements or limitations of the invention, and need not apply in other embodiments. Numerous other alternative embodiments within the scope of the appended claims will be readily apparent to those skilled in the art.

What is claimed is:

1. A method comprising:
   storing in a first server identifiers of respective users in association with respective pseudonyms;
   storing in a second server templates of the respective users in association with the respective pseudonyms;
   receiving input from a given user in conjunction with an authentication attempt;
   determining if a first portion of the received input is associated with one of the user identifiers stored in the first server;
   if the first portion of the received input is associated with one of the user identifiers stored in the first server, providing the corresponding pseudonym from the first server to the second server; and
   authenticating the given user based on a determination as to whether or not a second portion of the received input matches one of the stored user templates corresponding to the pseudonym provided to the second server;
   wherein the second portion of the received input comprises a sample provided by the given user, the sample comprising biometric data;
   wherein the first server and the second server are distinct from each other;
   wherein storing user identifiers in the first server in association with the respective pseudonyms comprises storing in the first server a set of first tuples, where one element of a given one of the first tuples denotes a given one of the user identifiers, and another element of the given first tuple denotes the corresponding one of the pseudonyms;
   wherein storing user templates in the second server in association with the respective pseudonyms comprises storing in the second server a set of second tuples, where one element of a given one of the second tuples denotes a given one of the user templates, and another element of the given second tuple denotes the corresponding one of the pseudonyms; and
   wherein the pseudonyms comprise respective random values.

2. The method of claim 1 wherein the user templates comprise respective biometric templates.

3. The method of claim 1 wherein the first portion of the received input comprises a user identifier of the given user.

4. The method of claim 3 wherein the first and second portions of the received input further comprise respective first and second ciphertexts, the first ciphertext comprising the user identifier encrypted under a public key of the first server, and the second ciphertext comprising the sample encrypted under a public key of the second server.

5. The method of claim 4 wherein the received input further comprises a session identifier and the first and second ciphertexts further comprise the session identifier encrypted under the respective public keys of the respective first and second servers.

6. The method of claim 4 further comprising:
   decrypting the first ciphertext in the first server; and
   if the user identifier from the decrypted first ciphertext matches one of the user identifiers stored in the first server, sending the corresponding pseudonym from the first server to the second server;
   decrypting the second ciphertext in the second server;
   if the pseudonym sent from the first server matches one of the user templates stored in the second server, attempting to match the sample from the decrypted second ciphertext against the corresponding stored template.

7. The method of claim 4 further comprising:
   decrypting the first ciphertext in the first server; and
   if the user identifier from the decrypted first ciphertext matches one of the user identifiers stored in the first server, sending the corresponding pseudonym from the first server to the second server obscured in a set of pseudonyms including the corresponding pseudonym and a plurality of chaff pseudonyms;
   decrypting the second ciphertext in the second server;
   for each of the pseudonyms in the set of pseudonyms sent from the first server that matches one of the user templates stored in the second server, attempting to match the sample from the decrypted second ciphertext against the corresponding stored template.

8. The method of claim 1 wherein the set of first tuples comprises a set of pairs $D_0 = \{(U_i, r_i)\}$ where $U_i$ denotes the user identifier for user i and $r_i$ denotes the random value of the corresponding pseudonym.

9. The method of claim 1 wherein the set of second tuples comprises a set of pairs $D_1 = \{(r_i, T_i)\}$ where $T_i$ denotes the user template for user i and $r_i$ denotes the random value of the corresponding pseudonym.

10. The method of claim 1 wherein the set of first tuples comprises a set of tuples $D_0 = \{(U_i, R_i, r_i)\}$ where $U_i$ denotes the user identifier for user i, $r_i$ denotes the random value of the corresponding pseudonym, and $R_i$ is a set of in pseudonyms such that $r_i \in R_i$ and $R_i$ includes m−1 chaff pseudonyms in addition to the corresponding pseudonym.

11. The method of claim 1 further comprising periodically refreshing at least a subset of the pseudonyms.

12. The method of claim 1 wherein authenticating the given user based on a determination as to whether or not a second portion of the received input matches one of the stored user templates comprises authenticating the given user in a controller associated with the first and second servers.

13. The method of claim 1 wherein authenticating the given user based on a determination as to whether or not a second portion of the received input matches one of the stored user templates comprises authenticating the given user in a controller that is implemented at least in part in an additional server separate from the first and second servers.

14. A computer program product comprising a non-transitory processor-readable storage medium having embodied therein one or more software programs, wherein the one or more software programs when executed by at least one processing device cause said at least one processing device:
   to store in a first server identifiers of respective users in association with respective pseudonyms;
   to store in a second server templates of the respective users in association with the respective pseudonyms;
   to receive input from a given user in conjunction with an authentication attempt;
   to determine if a first portion of the received input is associated with one of the user identifiers stored in the first server;

if the first portion of the received input is associated with one of the user identifiers stored in the first server, to provide the corresponding pseudonym from the first server to the second server; and to authenticate the given user based on a determination as to whether or not a second portion of the received input matches one of the stored user templates corresponding to the pseudonym provided to the second server;

wherein the second portion of the received input comprises a sample provided by the given user, the sample comprising biometric data;

wherein the first server and the second server are distinct from each other;

wherein storing user identifiers in the first server in association with the respective pseudonyms comprises storing in the first server a set of first tuples, where one element of a given one of the first tuples denotes a given one of the user identifiers, and another element of the given first tuple denotes the corresponding one of the pseudonyms;

wherein storing user templates in the second server in association with the respective pseudonyms comprises storing in the second server a set of second tuples, where one element of a given one of the second tuples denotes a given one of the user templates, and another element of the given second tuple denotes the corresponding one of the pseudonyms; and wherein the pseudonyms comprise respective random values.

15. An authentication system comprising:

a first server configured to store identifiers of respective users in association with respective pseudonyms; and a second server configured to store templates of the respective users in association with the respective pseudonyms;

wherein input is received from a given user in conjunction with an authentication attempt;

the first server being configured to determine if a first portion of the received input is associated with one of the user identifiers stored in the first server;

wherein if the first portion of the received input is associated with one of the user identifiers stored in the first server, the corresponding pseudonym is provided from the first server to the second server;

wherein the given user is authenticated based on a determination as to whether or not a second portion of the received input matches one of the stored user templates corresponding to the pseudonym provided to the second server;

wherein the second portion of the received input comprises a sample provided by the given user, the sample comprising biometric data;

wherein the first server and the second server are distinct from each other;

wherein storing user identifiers in the first server in association with the respective pseudonyms comprises storing in the first server a set of first tuples, where one element of a given one of the first tuples denotes a given one of the user identifiers, and another element of the given first tuple denotes the corresponding one of the pseudonyms; and wherein storing user templates in the second server in association with the respective pseudonyms comprises storing in the second server a set of second tuples, where one element of a given one of the second tuples denotes a given one of the user templates, and another element of the given second tuple denotes the corresponding one of the pseudonyms;

wherein the pseudonyms comprise respective random values; and wherein the first server and the second server are implemented using at least one processing device.

16. The authentication system of claim 15 further comprising a controller associated with the first and second servers and configured to authenticate the given user based on said determination.

17. The authentication system of claim 16 wherein at least a portion of the controller is implemented in at least one of the first server and the second server.

18. The authentication system of claim 16 wherein at least a portion of the controller is implemented in an additional server separate from the first and second servers.

19. A communication system comprising the authentication system of claim 15 and one or more client devices adapted to provide the input to the authentication system over a network in conjunction with the authentication attempt.

20. The computer program product of claim 14 wherein: the set of first tuples comprises a set of pairs $D_0=\{(U_i, r_i)\}$ where $U_i$ denotes the user identifier for user i and $r_i$ denotes the random value of the corresponding pseudonym.

21. The computer program product of claim 14 wherein the set of second tuples comprises a set of pairs $D_1=\{(r_i, T_i)\}$ where $T_i$ denotes the user template for user i and $r_i$ denotes the random value of the corresponding pseudonym.

* * * * *

UNITED STATES PATENT AND TRADEMARK OFFICE
CERTIFICATE OF CORRECTION

| | | |
|---|---|---|
| PATENT NO. | : 9,043,890 B1 | Page 1 of 1 |
| APPLICATION NO. | : 13/905600 | |
| DATED | : May 26, 2015 | |
| INVENTOR(S) | : Guoying Luo et al. | |

It is certified that error appears in the above-identified patent and that said Letters Patent is hereby corrected as shown below:

In the specification:

Column 4, line 14, please change "stored, in" to --stored in--

Column 11, line 21, please change "obsolete'" to --obsolete--

Column 12, line 60, please change "FIG." to --FIGS.--

In the claims:

Column 14, line 38, claim 10, please change "in pseudonyms" to --m pseudonyms--

Signed and Sealed this
Twenty-ninth Day of September, 2015

Michelle K. Lee
*Director of the United States Patent and Trademark Office*